(12) United States Patent
Miyano

(10) Patent No.: US 8,578,065 B2
(45) Date of Patent: Nov. 5, 2013

(54) COMMUNICATION SPEED CONTROL APPARATUS AND COMMUNICATION SPEED CONTROL METHOD

(75) Inventor: Takahiko Miyano, Iwaki (JP)

(73) Assignee: Alpine Electronics, Inc., Tokyo (JP)

( * ) Notice: Subject to any disclaimer, the term of this patent is extended or adjusted under 35 U.S.C. 154(b) by 109 days.

(21) Appl. No.: 13/184,063

(22) Filed: Jul. 15, 2011

(65) Prior Publication Data

US 2012/0110220 A1    May 3, 2012

(30) Foreign Application Priority Data

Oct. 27, 2010    (JP) ................................ 2010-240267

(51) Int. Cl.
*G06F 3/00* (2006.01)
*G06F 13/00* (2006.01)

(52) U.S. Cl.
USPC .............................................. 710/14; 710/33

(58) Field of Classification Search
USPC ................................................ 710/14, 33, 60
See application file for complete search history.

(56) References Cited

U.S. PATENT DOCUMENTS

| | | | |
|---|---|---|---|
| 6,625,761 B1 * | 9/2003 | Sartore et al. .................... | 714/43 |
| 6,774,937 B1 * | 8/2004 | Kobayashi ................. | 348/222.1 |
| 2004/0153264 A1 * | 8/2004 | Teich et al. ...................... | 702/65 |
| 2005/0071514 A1 * | 3/2005 | Anderson et al. .................. | 710/1 |
| 2005/0138231 A1 * | 6/2005 | Yamaguchi et al. ............. | 710/15 |
| 2005/0149640 A1 | 7/2005 | Hosokawa | |
| 2006/0053244 A1 * | 3/2006 | Fruhauf et al. ................ | 710/313 |
| 2010/0082846 A1 | 4/2010 | Kim et al. | |

FOREIGN PATENT DOCUMENTS

| | | |
|---|---|---|
| JP | 2005-182380 | 7/2005 |
| JP | 2005-327247 | 11/2005 |
| JP | 2006-330831 | 12/2006 |
| JP | 2007-172160 | 7/2007 |
| JP | 2009-193358 | 8/2009 |

OTHER PUBLICATIONS

Universal Serial Bus—Wikipedia, the free encyclopedia, Oct. 9, 2010, http://web.archive.org/web/20101009053350/http://en.wikipedia.org/wiki/Universal_Serial_Bus.*
Universal Serial Bus Specification 2.0, Revision 2.0, Apr. 27, 2000, pp. 1, 142, 150-151.*

* cited by examiner

*Primary Examiner* — Farley Abad
(74) *Attorney, Agent, or Firm* — Brinks Hofer Gilson & Lione

(57) ABSTRACT

A communication speed control apparatus for controlling communication between a host device and an external device in accordance with a high-speed communication mode or a low-speed communication mode includes a list storage unit configured to store a list of specification information of external devices that are incompatible with the host device when data communication is carried out using the high-speed communication mode and a specification information obtainment unit configured to obtain external device specification information from the external device. A device determination unit is configured to determine if the external device specification information obtained from the external device corresponds to an incompatible external device based on the stored specification information and a communication speed control unit sets a data communication speed to the low-speed communication mode if the device determination unit determines that the external device in incompatible with the host device.

6 Claims, 5 Drawing Sheets

COMMUNICATION SYSTEM IN WHICH COMMUNICATION SPEED CONTROL APPARATUS
ACCORDING TO FIRST EMBODIMENT HAS BEEN APPLIED

EXAMPLE OF FUNCTIONAL CONFIGURATION OF USB HOST CONTROLLER ACCORDING TO FIRST EMBODIMENT

EXAMPLE OF FUNCTIONAL CONFIGURATION OF USB HOST CONTROLLER ACCORDING TO SECOND EMBODIMENT

EXAMPLE OF DIALOG WINDOW FOR INPUTTING CABLE LENGTH ACCORDING TO SECOND EMBODIMENT

EXAMPLE OF FUNCTIONAL CONFIGURATION OF USB HOST CONTROLLER
ACCORDING TO THIRD EMBODIMENT

COMMUNICATION SPEED CONTROL APPARATUS AND COMMUNICATION SPEED CONTROL METHOD

PRIORITY CLAIM

This application claims the benefit of Japanese Patent Application No. 2010-240267, filed on Oct. 27, 2010, and which is incorporated by reference herein in its entirety.

BACKGROUND

1. Field of the Invention

The present invention relates to communication speed control apparatuses and communication speed control methods, and particularly relates to techniques for controlling the speed of data communication carried out between a host computer and an external device.

2. Description of Related Art

USB (Universal Serial Bus) has become common as a standard for connecting a host computer such as a personal computer or a navigation device to various types of peripheral devices serving as external devices and carrying out data communication. USB 2.0, for example, provides three types of communication speeds, which are, in order from the fastest to slowest, high-speed mode (called "HS mode" hereinafter), full-speed mode (called "FS mode" hereinafter), and low-speed mode (called "LS mode" hereinafter).

USB 2.0-compliant host computers (called "USB hosts" hereinafter) and USB 2.0-compliant external devices (called "USB devices" hereinafter) are capable of carrying out data communication using any of these three types of communication speeds. Generally, when a USB host detects a connection with a USB device, the bus is reset (that is, both the D+ and D− signal lines are set to low level) and a handshake process known as a "chirp" is carried out, thereby determining the communication speed. At this time, the communication speed is set to HS in the case where a USB device that is compliant with the HS mode has been connected, whereas the communication speed is set to FS in the case where a USB device that is compliant with the FS mode has been connected.

After the communication speed has been determined, the USB host obtains information necessary for resetting from the USB device and executes processes that enable the USB device to be used. The USB host and the USB device then exchange data. USB features four types of data transfer methods, i.e., control transfer, interrupt transfer, bulk transfer, and isochronous transfer.

Control transfer is a transfer method for carrying out the basic control of the USB device, and is used when recognizing the USB device and so on. Interrupt transfer is a method for transferring data of a small size in a cyclic manner, and is primarily used when communicating with a USB device such as a mouse or a keyboard. Bulk transfer is a method for transferring large amounts of data, and is primarily used when exchanging data with a storage device such as a hard disk. Isochronous transfer is a method for transferring data in real time, and is primarily used when streaming audio data, video data, and so on.

Note that in the normal USB 2.0 specifications, when an HS mode or FS mode USB device is recognized by the USB host, the communication speed is not changed until a reset is carried out or the device is reconnected. However, techniques that enable the modes to be changed between the HS mode and the FS mode have been proposed (for example, see JP-2006-330831A, JP-2005-327247A, JP-2005-182380A, and JP-2007-172160A).

JP-2006-330831A discloses toggling between HS mode and FS mode in accordance with the amount of data to be transferred, the remaining battery charge of a mobile electronic device, and so on. JP-2005-327247A discloses toggling the communication speed by a user operating a toggle switch. JP-2005-182380A, meanwhile, discloses prohibiting HS mode in the case where the communication error rate is greater than or equal to a predetermined value. Finally, JP-2007-172160A discloses switching from HS mode to FS mode in the case where a poor communication state, in which the quality of communication has dropped, has continued for a set amount of time.

In addition, a technique has been disclosed in which model specification information of incompatible USB memories, for which communication errors can be foreseen, is stored in advance in a storage unit in a USB host, and when the USB host has detected a connection with a USB memory, the USB host obtains the model specification information stored in the USB memory and carries out a warning operation in the case where it has been determined that model specification information that matches the obtained model specification information is stored in the storage unit (for example, see JP-2009-193358A).

When a USB device that has poor compatibility with a USB host is connected to the USB host, and HS mode is set, the waveform of the data being communicated may degrade, leading to the communication errors. In the case where data communication is carried out using the control transfer method, the interrupt transfer method, or the bulk transfer method, a retry is executed through hardware when a communication error has been detected, thus making it possible to once again execute the same data communication.

Meanwhile, because isochronous transfer, which is carried out when streaming audio, video, or the like, is a real-time transfer method, it is not possible to execute a retry when a communication error has occurred. Accordingly, there has been a problem in that when a communication error has occurred, the data at the location of the communication error is lost, which leads to audio dropouts, video dropouts, and the like.

If the techniques disclosed in JP-2005-182380A and JP-2007-172160A are used in response to this problem, switching the communication speed from HS mode to FS mode in the case where the error rate is greater than or equal to a predetermined value or a poor communication state has continued for a set amount of time makes it possible to increase the communication quality and prevent data loss.

However, with the techniques disclosed in JP-2005-182380A and JP-2007-172160A, a state of poor communication quality has continued up until the communication speed has been switched from HS mode to FS mode, and thus communication errors occur. For this reason, data loss will occur in the case where a communication error has occurred during isochronous transfer, and thus the problem of audio dropouts and video dropouts cannot be eliminated.

Finally, with the technique disclosed in JP-2009-193358A, a warning is carried out as soon as an incompatible USB memory, for which the occurrence of communication errors can be foreseen, is connected to the USB host. However, even if such a warning is carried out, the communication speed is set to HS mode in the case where an HS mode-compliant USB device has been connected; errors will therefore occur during actual communication. For this reason, data loss will occur in the case where a communication error has occurred during isochronous transfer, and thus the problem of audio dropouts and video dropouts cannot be eliminated.

Having been conceived in order to solve the aforementioned problems, it is an object of the present invention to prevent data loss caused by communication errors in HS mode when carrying out data communication between a host computer and an external device.

SUMMARY

In order to solve the aforementioned problems, in the present invention, the specification information of incompatible external devices, for which the occurrence of a communication error can be foreseen in the case where data communication is carried out using a high-speed communication mode, is stored in a list storage unit. Then, when an external device has been connected to a host computer, it is determined whether or not the specification information of that external device matches any of the specification information of the incompatible external devices stored in the list storage unit, and the speed mode of the data communication is set to the low-speed communication mode in the case where it has been determined that the specification information matches.

EFFECTS OF THE INVENTION

According to the present invention configured as described above, in the case where an incompatible external device has been connected to the host computer, the speed mode of the data communication is set to the low-speed communication mode, in which communication errors are unlikely to occur, prior to the actual start of data communication. For this reason, when carrying out data communication between the host computer and the external device, data loss caused by communication errors in the high-speed communication mode can be prevented. Through this, even when, for example, carrying out isochronous transfer in order to stream audio, video, or the like, it is possible to prevent data loss caused by communication errors from occurring, which makes it possible to avoid the occurrence of audio dropouts, video dropouts, and so on.

DETAILED DESCRIPTION

First Embodiment

Figure 1:
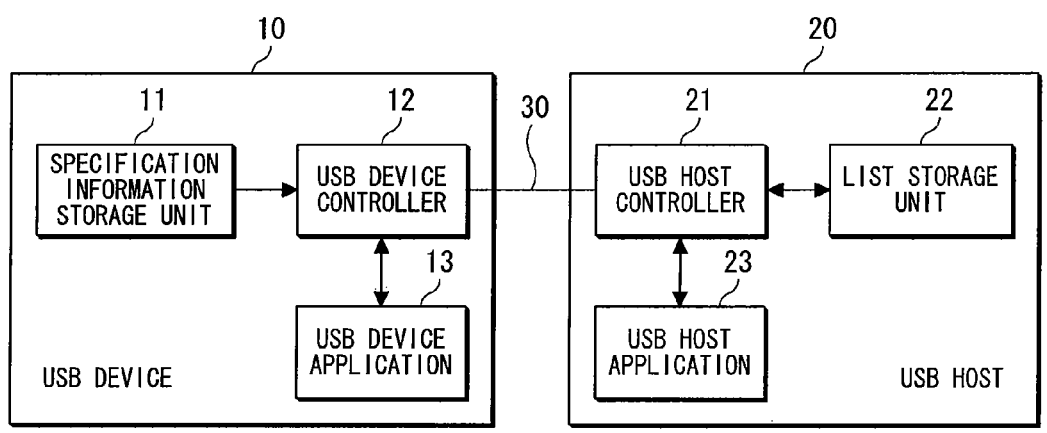
FIG. 1 is a diagram illustrating an example of a communication system having a communication speed control apparatus according to a first embodiment.

Hereinafter, a first embodiment of the present invention will be described based on the drawings. FIG. 1 is a diagram illustrating an example of the overall configuration of a communication system in which a communication speed control apparatus according to the first embodiment has been applied. As shown in FIG. 1, the communication system according to the present embodiment includes a USB device 10 (this corresponds to the "external device" in the appended Claims) and a USB host 20 (this corresponds to the "host computer" in the appended Claims), and the USB device 10 and the USB host 20 are capable of being connected to each other using a USB cable 30.

The USB device 10 includes a specification information storage unit 11, a USB device controller 12, and a USB device application 13. The USB host 20 includes a USB host controller 21, a list storage unit 22, and a USB host application 23. The communication speed control apparatus according to the present embodiment is configured by the USB host controller 21 and the list storage unit 22 of the USB host 20.

The specification information storage unit 11 stores specification information for specifying the USB device 10. The specification information is configured so as to include a vendor ID and a product ID. The vendor ID is a value unique to the vendor that manufactured the USB device 10. The product ID is a unique value held by the USB device 10, and these product IDs are managed on a vendor-by-vendor basis.

The USB device controller 12 sets the communication speed to the HS mode or the FS mode in response to a command from the USB host 20, and carries out data communication with the USB host 20 at the set communication speed. For example, the USB device controller 12 sends specification information read out from the specification information storage unit 11 to the USB host 20 in response to a request from the USB host 20. The USB device controller 12 sends data generated by the USB device application 13 to the USB host 20, receives data sent from the USB host 20, and so on.

The USB device application 13 is an application software executing unit for implementing the functions of the USB device 10. For example, in the case where the USB device 10 is a storage medium such as a USB memory, the USB device application 13 realizes, through software, a function for reading and writing data and a function for transferring data. On the other hand, in the case where the USB device 10 is a smartphone, the USB device application 13 realizes, through software, a function for playing back data such as audio, video, and so on.

The USB host controller 21 sets the communication speed to HS mode or FS mode, and carries out data communication with the USB device 10 at the set communication speed. For example, the USB host controller 21 makes a request to the USB device 10 to send the specification information, and receives the specification information sent from the USB device 10 as a response to the request. In addition, the USB host controller 21 receives data generated by the USB device application 13 from the USB device 10, sends data generated by the USB host application 23 to the USB device 10, and so on.

The list storage unit 22 stores, as a list, the specification information for specifying one or more USB devices 10 for which communication errors can be foreseen when carrying out data communication in HS mode (such devices are referred to as "incompatible external devices"). Like the specification information stored in the specification information storage unit 11, the specification information of the incompatible external devices is configured so as to include a vendor ID and a product ID. The specification information of several incompatible external devices is stored in advance in the list storage unit 22 from its initial state. In addition, as will be discussed later, the specification information of incompatible external devices aside from those whose specification information is stored from its initial state is added to and stored in the list storage unit 22 as necessary.

The USB host application 23 is an application software or driver software execution unit for implementing various functions of the USB host 20. This software is necessary for the cooperative execution with the USB device application 13 in the USB device 10; for example, when the USB device 10 is first connected to the USB host 20, the software is automatically installed in the USB host 20 from the USB device 10. Alternatively, the software is installed in the USB host 20 from a recording medium aside from the USB device 10 that has been prepared separately, through operations performed manually by a user.

Figure 2:
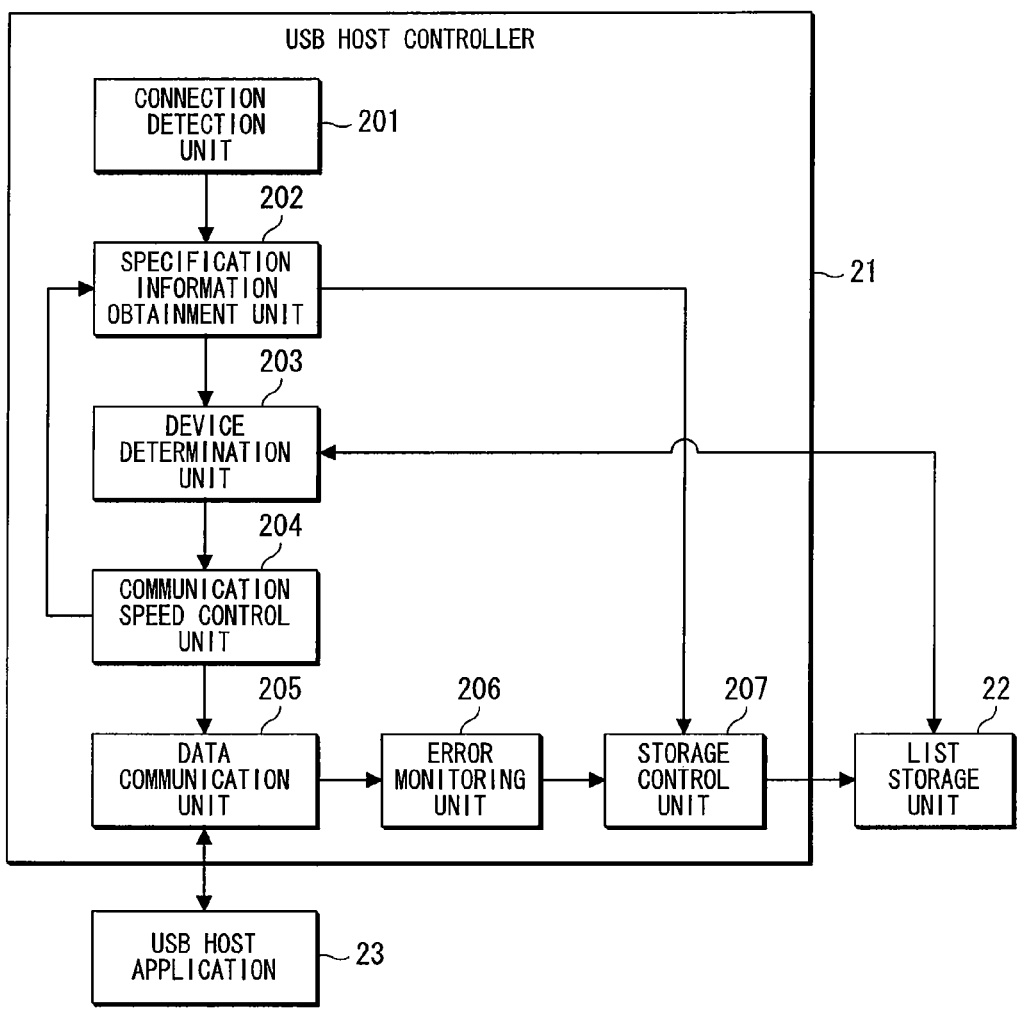
FIG. 2 is a block diagram illustrating a functional configuration of a USB host controller according to the first embodiment.

FIG. 2 is a block diagram illustrating an example of the functional configuration of the USB host controller 21 according to the first embodiment. As shown in FIG. 2, the USB host controller 21 includes, as its functional configuration, a connection detection unit 201, a specification information obtainment unit 202, a device determination unit 203, a communication speed control unit 204, a data communication unit 205, an error monitoring unit 206, and a storage control unit 207.

The connection detection unit 201 detects the USB device 10 being connected to the USB host 20. The specification information obtainment unit 202 obtains the specification information of the USB device 10 from that USB device 10 in the case where the connection detection unit 201 has detected that the USB device 10 has been connected to the USB host 20. In other words, the specification information obtainment unit 202 carries out control transfer with the USB device 10 in FS mode, which has been forcibly set by the communication speed control unit 204, and then resets the USB device 10. At the time of this reset, the specification information obtainment unit 202 makes a send request for the specification information to the USB device 10, and obtains the specification information of the USB device 10 from the USB device 10.

The device determination unit 203 determines whether or not the specification information of the USB device 10 obtained by the specification information obtainment unit 202 matches any of the specification information of incompatible external devices stored in the list storage unit 22. Specifically, the device determination unit 203 determines whether or not the vendor IDs included in the specification information match. Alternatively, the device determination unit 203 may determine whether or not both the vendor IDs and the product IDs included in the specification information match.

The communication speed control unit 204 controls the speed of the data communication carried out with the USB device 10. When the USB device 10 is in its initial state immediately after being connected to the USB host 20, the communication speed control unit 204 sets the communication speed to FS mode. In other words, when the USB device 10 has been connected to the USB host 20, the communication speed control unit 204 forces the data communication speed to FS mode, regardless of whether the USB device 10 is compliant with HS mode or FS mode.

Meanwhile, in the case where it has been determined by the device determination unit 203 that the specification information of the USB device 10 matches any of the specification information of incompatible external devices, the communication speed control unit 204 keeps the communication speed set to FS mode. On the other hand, in the case where it has been determined by the device determination unit 203 that the specification information of the USB device 10 does not match any of the specification information of the incompatible external devices, the communication speed control unit 204 resets the bus, executes a handshake process, and re-sets the communication speed. At this time, in the case where the USB device 10 is HS mode-compliant, the communication speed is HS mode, whereas in the case where the USB device 10 is FS mode-compliant, the communication speed is FS mode.

The data communication unit 205 carries out data communication with the USB device 10 at the communication speed set by the communication speed control unit 204 (that is, HS mode or FS mode). Here, whether to carry out data communication using the interrupt transfer, bulk transfer, or isochronous transfer method differs depending on the type of USB device 10 that is connected, or in other words, what type of USB device application 13 it is that is to be executed. For example, in the case where communication is carried out with a USB device 10 such as a mouse or a keyboard, data communication is carried out using interrupt transfer; in the case where communication is carried out with a USB device 10 such as a USB memory, data communication is carried out using bulk transfer; and in the case where audio data, video data, or the like is streamed to a USB device 10 such as a smartphone, data communication is carried out using isochronous transfer.

The error monitoring unit 206 monitors for the occurrence of communication errors when the data communication unit 205 is executing data communication in HS mode. In the case where the error monitoring unit 206 has detected the occurrence of a communication error, the storage control unit 207 adds, to the list storage unit 22, the specification information obtained by the specification information obtainment unit 202 for the USB device 10 that is connected to the USB host 20 at the time of the error as specification information of incompatible external devices.

Here, although the specification information of the USB device 10 is stored in the list storage unit 22 as specification information of incompatible external devices in the case where the occurrence of a communication error has been detected, the present invention is not limited to this example. For example, the transfer may be retried in the case where a communication error has occurred while control transfer, interrupt transfer, or bulk transfer is being carried out. The specification information of the USB device 10 may then be stored in the list storage unit 22 as specification information of incompatible external devices in the case where the data communication cannot be carried out normally and the process times out after the retry attempt has been made.

Alternatively, an error rate may be measured during a predetermined amount of time, and in the case where the error rate has become greater than or equal to a predetermined value, the specification information of the USB device 10 may be stored in the list storage unit 22 as specification information of incompatible external devices. According to this example, it is possible to apply this technique when carrying out isochronous transfer, in which retries cannot be carried out.

Figure 3:
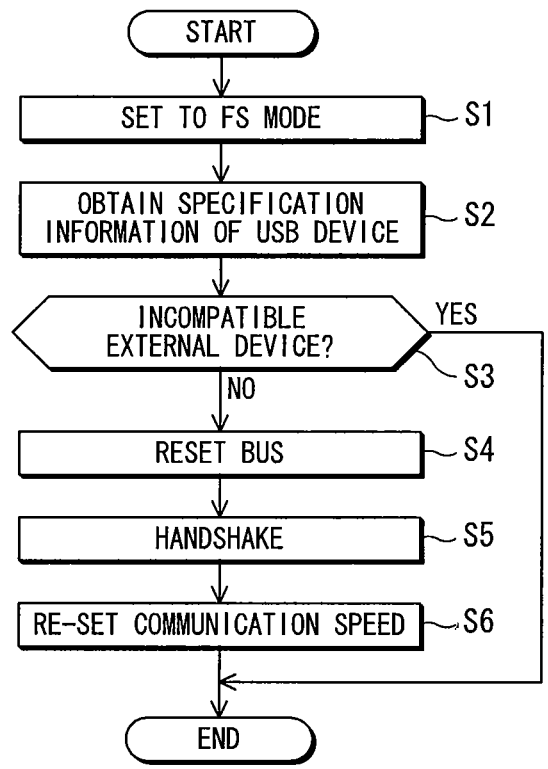
FIG. 3 is a flowchart illustrating operations performed by the USB host controller according to the first embodiment.

FIG. 3 is a flowchart illustrating an example of operations performed in the communication speed control carried out by the USB host controller 21 configured as described above. The flowchart illustrated in FIG. 3 starts when the connection detection unit 201 has detected that the USB device 10 has been connected to the USB host 20.

In FIG. 3, the communication speed control unit 204 sets the speed of the data communication to FS mode (step S1). Meanwhile, the specification information obtainment unit 202 carries out control transfer with the USB device 10 in FS mode, and obtains the specification information of the USB device 10 from the USB device 10 by resetting the USB device 10 (step S2).

Next, the device determination unit 203 determines whether or not the specification information of the USB device 10 obtained by the specification information obtainment unit 202 matches with the specification information of incompatible external devices stored in the list storage unit 22 (that is, whether or not the specification information of the USB device 10 is stored in the list storage unit 22) (step S3).

Here, in the case where the device determination unit 203 has determined that the specification information of the USB device 10 is stored in the list storage unit 22, the processing illustrated in FIG. 3 ends. In this case, the communication speed control unit 204 keeps the data communication speed set to FS mode.

On the other hand, in the case where the device determination unit 203 has determined that the specification information of the USB device 10 is stored in the list storage unit 22, the communication speed control unit 204 carries out a bus reset (step S4), reconnects the USB device 10 by carrying out a handshake process (step S5), and through this, re-sets the speed of the data communication (step S6).

As described in detail above, in the first embodiment, the specification information of incompatible external devices for which communication errors can be foreseen is stored in the list storage unit 22 in the case where data communication is carried out in HS mode. Accordingly, when the USB device 10 is connected to the USB host 20, the data communication speed is set to FS mode in the case where the specification information of that USB device 10 matches any of the specification information of incompatible external devices stored in the list storage unit 22.

According to the first embodiment configured in this manner, the data communication is set to FS mode, in which communication errors are unlikely to occur, in the case where an incompatible external device is connected to the USB host 20. Accordingly, when carrying out data communication between the USB device 10 and the USB host 20, it is possible to prevent data loss caused by communication errors occurring during HS mode. Through this, even when, for example, carrying out isochronous transfer in order to stream audio, video, or the like, it is possible to prevent data loss caused by communication errors, which makes it possible to avoid the occurrence of audio dropouts, video dropouts, and so on.

Furthermore, in the first embodiment, in the case where the occurrence of a communication error has been detected while data communication is actually being executed in HS mode, the specification information of the USB device 10 that is connected to the USB host 20 at that time is added to the list storage unit 22 as specification information of incompatible external devices.

According to this configuration, even if the USB device 10 is not assumed in advance to be an incompatible external device (that is, the specification information of the USB device 10 is not stored in the list storage unit 22 in its initial state), if that USB device 10 is likely to cause communication errors in HS mode, the specification information of the USB device 10 is added to the list storage unit 22 as specification information of incompatible external devices after the USB device 10 has been connected to the USB host 20 and data communication has been carried out in HS mode. Through this, the data communication will always be carried out in FS mode thereafter when the USB device that is connected again, which makes it possible to prevent data loss caused by communication errors.

Furthermore, in the first embodiment, when the USB device 10 is connected to the USB host 20, the communication speed is forced to FS mode, rather than being set to HS mode; after that, the communication speed is re-set in the case where it has been determined that the USB device 10 is not an incompatible external device. Through this, when the specification information obtainment unit 202 executes a reset process on the USB device 10 immediately after the USB device 10 has been connected to the USB host 20, control transfer can always be carried out in FS mode; this makes it possible to avoid, with certainty, problems in which the specification information cannot be obtained from the USB device 10 due to the occurrence of a communication error.

Second Embodiment

Figure 4:
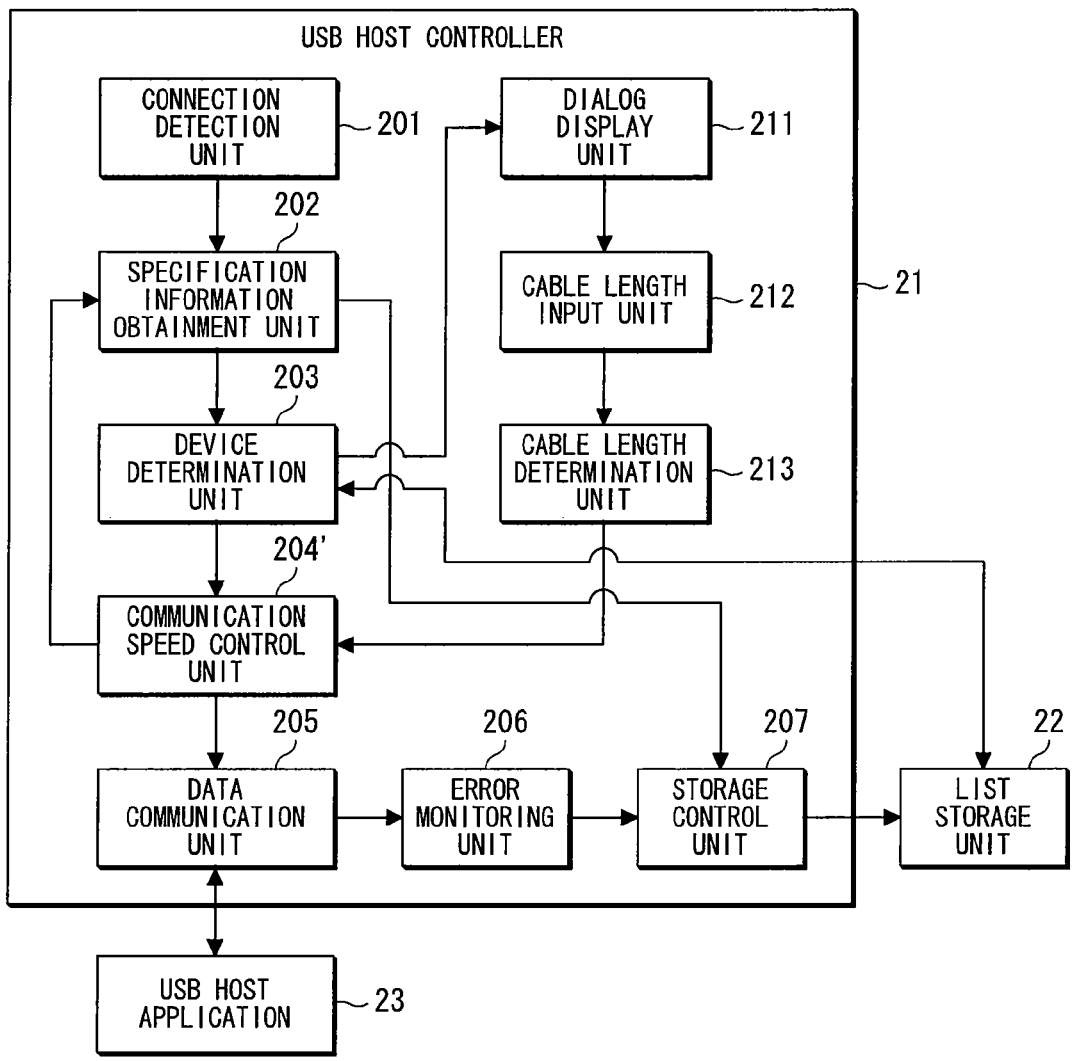
FIG. 4 is a block diagram illustrating the functional configuration of a USB host controller according to a second embodiment.

Next, a second embodiment of the present invention will be described based on the drawings. The configuration of the communication system in which a communication speed control apparatus according to the second embodiment has been applied is the same as that shown in FIG. 1. FIG. 4 is a block diagram illustrating an example of the functional configuration of the USB host controller 21 according to the second embodiment. Note that in FIG. 4, elements to which the same reference numerals as those shown in FIG. 2 have been added have the same functions, and thus redundant descriptions thereof will be omitted here.

As shown in FIG. 4, the USB host controller 21 according to the second embodiment further includes a dialog display unit 211, a cable length input unit 212, and a cable length determination unit 213. Furthermore, the USB host controller 21 according to the second embodiment includes a communication speed control unit 204', whose functions differ from the communication speed control unit 204, in place of the communication speed control unit 204.

Figure 5:
FIG. 5 is a diagram illustrating a dialog window used to input a cable length according to the second embodiment.

In the case where the device determination unit 203 has determined that the specification information of the USB device 10 matches any of the specification information of incompatible external devices stored in the list storage unit 22, the dialog display unit 211 displays, in a display (not shown) of the USB host 20, a dialog window for inputting the cable length of the USB cable 30 that connects the USB device 10 to the USB host 20. FIG. 5 is a diagram illustrating an example of the dialog window.

The cable length input unit 212 receives the input of cable length information that specifies the length of the USB cable 30, resulting from operations carried out by a user through the dialog window. The cable length determination unit 213 determines whether or not the cable length specified by the cable length information inputted through the cable length input unit 212 is greater than or equal to a predetermined value (for example, 1.5 m).

The communication speed control unit 204' keeps the speed of the data communication set to FS mode in the case where the device determination unit 203 has determined that the specification information of the USB device 10 matches any of the specification information of incompatible external devices and the cable length determination unit 213 has determined that the cable length is greater than or equal to the predetermined value.

On the other hand, the communication speed control unit 204' carries out a bus reset, executes a handshake process, and re-sets the communication speed in the case where the device determination unit 203 has determined that the specification information of the USB device 10 does not match the specification information of the incompatible external devices, or in the case where the cable length determination unit 213 has determined that the cable length of the USB cable 30 inputted by the user is less than the predetermined value.

Even if the USB device 10 that has been connected to the USB host 20 is an incompatible external device, it is not necessarily the case that a communication error will always occur. In other words, there are cases where communication errors occur only rarely when the USB cable 30 is short, whereas communication errors are likely to occur when the USB cable 30 is long. This is because if the USB cable 30 is long, the data that is being communicated over the cable is more susceptible to external noise.

According to the second embodiment configured as described above, the communication speed is forced to FS mode only in the case where the length of the USB cable 30 that is used for the connection is greater than or equal to a predetermined value, even if the USB device 10 that is connected to the USB host 20 is an incompatible external device. Conversely, if the length of the USB cable 30 is less than a predetermined value, the communication speed that is suitable for the USB device 10 (HS mode or FS mode) is set as a result of the handshake process. Through this, it is possible to prevent FS mode, whose communication speed is slow, from being set forcibly even in the cases where the USB cable 30 is short, and thus it is unlikely that communication errors will occur.

Although the aforementioned second embodiment describes an example in which the USB device 10 is an incompatible external device and the communication speed is forced to FS mode in the case where the length of the USB cable 30 is greater than or equal to the predetermined value, it should be noted that the present invention is not limited thereto. For example, the communication speed may be set to FS mode in a compulsory manner in the case where the length of the USB cable 30 is greater than or equal to the predetermined value, regardless of whether or not the USB device 10 is an incompatible external device. This is because even if the USB device 10 is not an incompatible external device, cables that have long cable lengths are susceptible to external noise, and are more likely to experience communication errors as a result.

Third Embodiment

Figure 6:
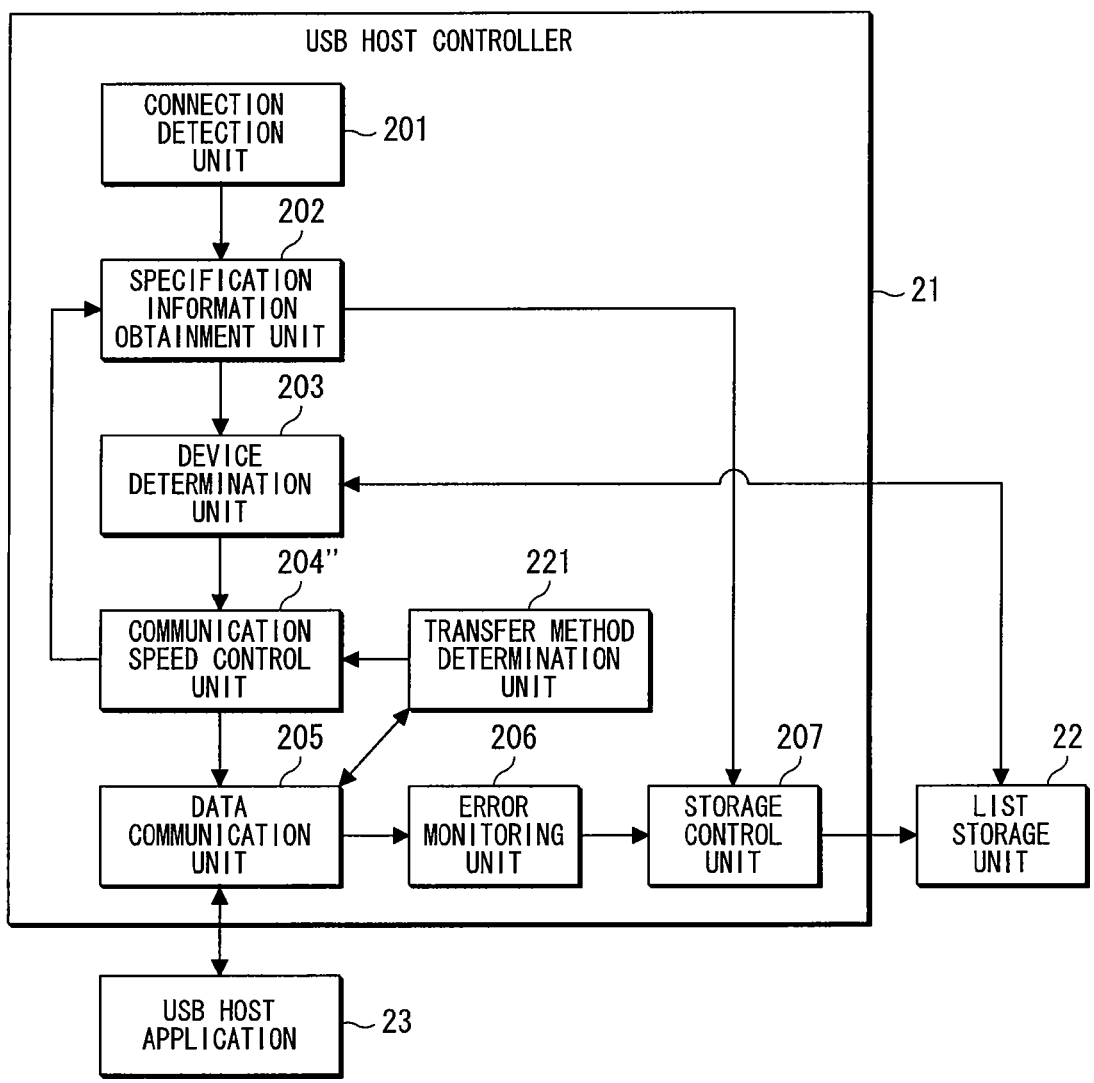
FIG. 6 is a block diagram illustrating the functional configuration of a USB host controller according to a third embodiment.

Next, a third embodiment of the present invention will be described based on the drawings. The configuration of the communication system in which a communication speed control apparatus according to the third embodiment has been applied is the same as that shown in FIG. 1. FIG. 6 is a block diagram illustrating an example of the functional configuration of the USB host controller 21 according to the third embodiment. Note that in FIG. 6, elements to which the same reference numerals as those shown in FIG. 2 have been added have the same functions, and thus redundant descriptions thereof will be omitted here.

As shown in FIG. 6, the USB host controller 21 according to the third embodiment further includes a transfer method determination unit 221. Furthermore, the USB host controller 21 according to the third embodiment includes a communication speed control unit 204", whose functions differ from the communication speed control unit 204, in place of the communication speed control unit 204.

The transfer method determination unit 221 determines whether or not the method of the data communication carried out by the data communication unit 205 between the USB device 10 and the USB host 20 is isochronous transfer. As described above, the method of the data communication carried out between the USB device 10 and the USB host 20 differs depending on what type of USB device 10 is connected, or in other words, on what type the USB device application 13 it is that is to be executed.

Accordingly, the transfer method determination unit 221 determines whether or not the data communication methods include at least isochronous transfer, based on the type of the USB device application 13 to be executed or the type of the USB host application 23 that operates along therewith. For example, if the USB device application 13 or the USB host application 23 is a type that streams audio or video, it is determined that the data communication methods include isochronous transfer.

The communication speed control unit 204" keeps the data communication set to FS mode in the case where the device determination unit 203 has determined that the specification information of the USB device 10 matches any of the specification information of incompatible external devices and the transfer method determination unit 221 has determined that the data communication methods include isochronous transfer.

On the other hand, in the case where it has been determined by the device determination unit 203 that the specification information of the USB device 10 does not match any of the pieces of specification information of the incompatible external devices, or in the case where the transfer method determination unit 221 has determined that the data communication methods do not include isochronous transfer, the communication speed control unit 204" resets the bus, executes a handshake process, and re-sets the communication speed.

In the case where the data communication method is control transfer, interrupt transfer, or bulk transfer, it is possible, even if a communication error has occurred, that data can be communicated correctly if a retry is carried out. However, retries are not possible with isochronous transfer. Accordingly, as described in the third embodiment, forcing the communication speed to FS mode only in the case where the transfer methods include isochronous transfer makes it possible to prevent the communication speed from being forced to the slower FS mode despite the transfer method allowing for retries.

Even if retries are possible in control transfer, interrupt transfer, and bulk transfer, it should be noted that there are also cases where, when communication errors occur with frequency, a retry cannot be completed before a timeout occurs and communication thus cannot be carried out. Accordingly, in the case where the communication speed has been set to HS mode because the data communication method is control transfer, interrupt transfer, or bulk transfer, and data communication has not been carried out correctly even after a retry has been made following the occurrence of a communication error, the communication speed may be forced from HS mode to FS mode before a timeout occurs. If the communication speed is switched before a timeout occurs, the next retry may succeed, which makes it possible to prevent data loss due to a communication error.

Note that the third embodiment may be applied in combination with the aforementioned second embodiment. In this case, the communication speed control unit keeps the data communication set to FS mode in the case where it has been determined that the specification information of the USB device 10 matches any of the specification information of incompatible external devices, the cable length is greater than or equal to the predetermined value, and the data communication methods include isochronous transfer. In other cases, the bus reset and handshake process are executed, and the communication speed is re-set.

It should be noted that the aforementioned first through third embodiments merely illustrate specific examples that may be employed in carrying out the present invention, and should not be interpreted as limiting the technical scope of the present invention in any way. In other words, the present invention may be carried out in various forms without departing from the essential spirit and primary characteristics thereof.

What is claimed is:

1. A communication speed control apparatus for controlling communication between a host device and an external device in accordance with a high-speed communication mode or a low-speed communication mode, the apparatus comprising:
   a list storage unit configured to store a list of specification information of external devices that are incompatible with the host device when data communication is carried out using the high-speed communication mode;
   a specification information obtainment unit configured to obtain external device specification information from the external device;
   a device determination unit configured to determine if the external device specification information obtained from the external device corresponds to an incompatible external device based on the stored specification information;
   a cable length input unit that accepts cable length information inputted by a user operation, specifying a length of a cable that connects the host computer to the external device;
   a cable length determination unit that determines if the cable length specified is greater than or equal to a predetermined value;
   a communication speed control unit configured to set a data communication speed to the low-speed communication mode if the device determination unit determines that the external device is incompatible with the host device or determines that the cable length is greater than or equal to the predetermined value, wherein setting of the low-speed communication mode is performed prior to a start of data communication between the host device and the external device; and
   the communication speed control unit performing a bus reset to reset the speed mode of the data communications if the external device does not correspond to an incompatible external device and if the cable length is less than the predetermined value.

2. The communication speed control apparatus according to claim 1, further comprising:
   an error monitoring unit configured to detect communication errors when data communication is carried out using the high-speed communication mode; and
   wherein when the error monitoring unit detects a communication error, a storage control unit adds the external device specification information obtained by the specification information obtainment unit to the list storage unit corresponding to specification information of an incompatible external device.

3. The communication speed control apparatus according to claim 1, further comprising:
   a transfer method determination unit configured to determine if methods for transferring data between the host computer and the external device include an isochronous transfer; and
   wherein the communication speed control unit sets the speed mode of the data communication to the low-speed communication mode if the transfer method determination unit determines that the data transfer methods include the isochronous transfer and if the device determination unit determines that the external device corresponds to an incompatible external device.

4. The communication speed control apparatus according to claim 1,
   wherein the communication speed control unit sets the data communication speed to the low-speed communication mode when the external device is connected to the host computer, and maintains the low-speed communication mode if the device determination unit determines that the external device corresponds to an incompatible external device; and
   wherein the communication speed control unit performs a bus reset to re-set the speed mode of the data communications if the device determination determines that the external device does not correspond to an incompatible external device.

5. The communication speed control apparatus according to claim 1, wherein the data communication is a USB-type data communication, the high-speed communication mode is a high-speed USB mode, and the low-speed communication mode is a full-speed USB mode.

6. A communication speed control method for controlling communication between a host computer and an external device in accordance with a high-speed communication mode or a low-speed communication mode, the method comprising:
   storing, in a list storage unit, a list of specification information of external devices that are incompatible with the host computer when data communication is carried out using the high-speed communication mode;
   setting, by the host computer, a speed mode of data communication to the low-speed communication mode when the external device is connected to the host computer;
   obtaining external device specification information from the external device;
   determining, by the host computer, if the external device specification information obtained from the external device corresponds to an incompatible external device based on the specification information stored in the list storage unit;
   obtaining, by a cable length input unit, cable length information specifying a length of a cable that connects the host computer to the external device;
   determining, by a cable length determination unit, if the cable length specified is greater than or equal to a predetermined value;
   maintaining the data communication speed in the low-speed communication mode if the external device corresponds to an incompatible external device or if the cable length is greater than or equal to the predetermined value; and
   performing a bus reset to reset the speed mode of the data communications if the external device does not correspond to an incompatible external device and if the cable length is less than the predetermined value.

* * * * *